Sept. 19, 1961 R. W. HARTZ 3,000,097
CAP REMOVAL TOOL
Filed July 6, 1959 3 Sheets-Sheet 1

INVENTOR.
ROBERT W. HARTZ
BY Pyle & Disher
ATTORNEYS

Sept. 19, 1961  R. W. HARTZ  3,000,097
CAP REMOVAL TOOL

Filed July 6, 1959  3 Sheets-Sheet 2

INVENTOR.
ROBERT W. HARTZ
BY *Pyle & Fisher*
ATTORNEYS

Sept. 19, 1961 R. W. HARTZ 3,000,097
CAP REMOVAL TOOL

Filed July 6, 1959 3 Sheets-Sheet 3

INVENTOR.
ROBERT W. HARTZ
BY Pyle & Disher
ATTORNEYS

United States Patent Office 3,000,097
Patented Sept. 19, 1961

3,000,097
CAP REMOVAL TOOL
Robert W. Hartz, Springdale, Conn., assignor to
Gregory Industries, Inc.
Filed July 6, 1959, Ser. No. 824,971
3 Claims. (Cl. 30—272)

This invention pertains to a chisel-like cutting tool and more particularly to a specialized cutting tool for removing a panel retaining fastener.

United States patent application Serial No. 695,874 was filed November 12, 1957, now Patent Number 2,983,181, in the name of Roger W. Sholle, under the title of "Sheet Fastener." In that application a metal cap for fastening sheets to studs or the like is disclosed. The cap disclosed there is a novel and improved device sold by the Nelson Stud Welding Division of Gregory Industries, Inc., under the trademark Setlok. Such caps are used in building construction, and the like, for fastening wall panels to frame structures.

When used, a Setlok cap is positioned over a stud with a panel to be fastened positioned between the cap and a shoulder on the stud. A single impact imparted to the cap drives the cap firmly against the panel and the panel in turn firmly against the shoulder of the stud and thereafter compresses or swedges the cap against the stud to lock the stud and cap together. When the cap and stud are locked together the panel is positioned between the cap and the shoulder.

On occasion, it is desirable to remove the panel. This may be necessitated by dismantling of a relatively temporary structure or for repair or modification of that portion of a building under a panel.

The present invention is directed to a specialized tool for facile removal of such fastener caps and particularly the novel and improved caps of the above-referenced patent application.

In the preferred embodiment disclosed in the above-referenced copending patent application, a fastener cap is described which has a top cylindrical portion, an intermediate externally frusto-conical shaped portion, and a base radially extending flange or ring which is below the frusto-conical shaped portion and at the lower end.

The tool in this invention has been devised for removal of this cap in particular. A tool shank is reciprocally carried in a sleeve. At the work or cutting end of the tool, the shank has a bifurcated chisel fixed to it and forming part of it. The bifurcated chisel has a pair of blades which are spaced to split opposite sides of a fastener cap. When the tool is positioned over the fastener and a blow is imparted to the shank, the splitting operation is performed.

The sleeve has a pair of locating fingers adjacent to the blades. When a cap is removed the locating fingers are positioned over the cap to locate the tool relative to the cap and then the bifurcated chisel is driven down to split the cap. One of the guide fingers then serves as a fulcrum while the other, along with the chisel blades, serves as a pry to separate the split portions of the fastener.

Accordingly, one of the principal objects of this invention is to provide a novel and improved tool for easily and quickly removing panel fastener caps.

A related object of this invention is to provide a novel and improved panel fastener cap removing tool which permits the removal of such a cap without damage to the panel or other structure.

Another object of this invention is to provide a novel and improved fastener cap removal tool which both splits a cap and serves as a lever to separate split portions by a prying action.

A more specialized and related object of this invention is to provide a novel and improved fastener cap removing tool which has a pair of locator fulcrums which serve both as guides for positioning the tool and as fulcrums for the prying action after the fastener cap has been split.

A related specialized object of this invention is to provide a novel and improved chisel-like fastener removing tool which has a bifurcated blade for splitting opposite sides of a fastener cap simultaneously.

Other objects and a fuller understanding of the invention may be had by referring to the following description and claims, taken in conjunction with the accompanying drawings in which:

Figure 1:
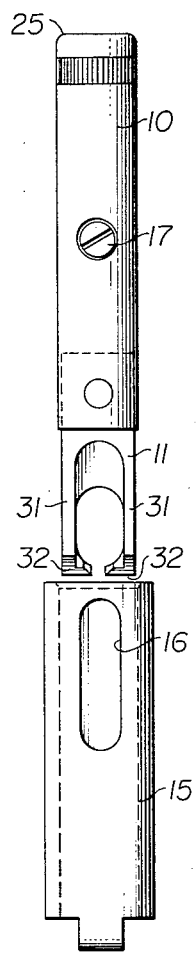
FIGURE 1 is an exploded view showing front elevational views of the sleeve and the remainder of the tool.

Referring to the drawings, a tool shank is shown at 10. The shank 10 includes a bifurcated chisel portion 11 at the cutting end of the shank. The chisel portion is preferably, as shown, a separate member which is received in a slot 12 formed in the shank. A pin 13 is pressed into a hole in the shank and through a hole in the chisel portion 11 to hold the shank and chisel together.

Figure 2:
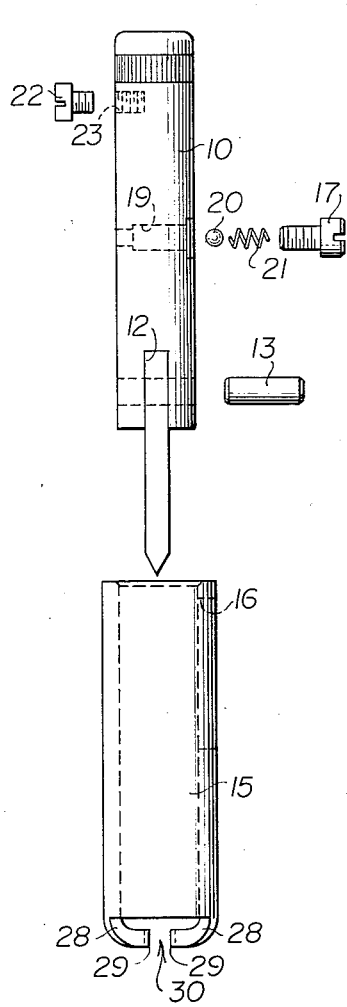
FIGURE 2 is an exploded view of the device showing each of the parts in side elevation.
Figure 3:
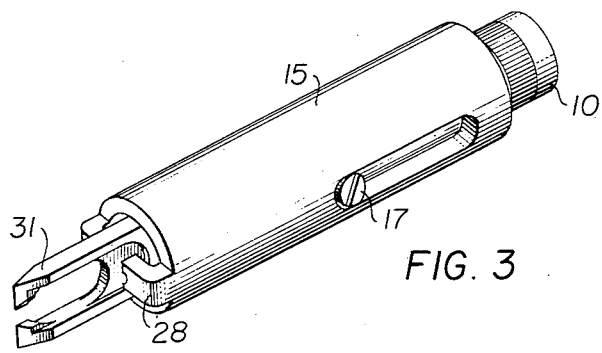
FIGURE 3 is a perspective view of an assembled tool.
Figure 4:
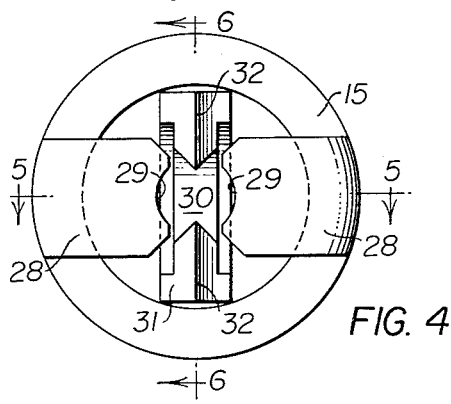
FIGURE 4 is an end view on an enlarged scale of an assembled tool.
Figure 4A:
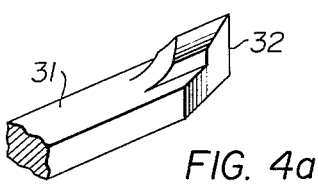
FIGURE 4A is a foreshortened perspective view of one of the chisel blades.

A tubular open-ended guide sleeve 15 telescopically receives the shank 10. The guide sleeve includes a longitudinally extending guide slot 16 which is formed through the wall of the sleeve 15. A guide finger 17 is carried by the shank 10. The guide finger projects into and coacts with the guide slot 16 to hold the sleeve and shank together and to guide the relative movement of the two in a rectilinear path. As best seen in FIGURE 2, the guide finger 17 preferably takes the form of a bolt which has a cylindrical head. The bolt threads into the transverse bore 19 in the shank.

The transverse bore 19 extends through the shank 10. A spherical ball 20 is carried in the bore 19. The ball 20 is urged radially outwardly by a spring 21 which is carried in the bore 19. The spring 21 is compressed between the guide finger 17 and the ball 20. The ball 20 is urged outwardly into rolling engagement with the wall of the guide sleeve 15 to maintain tight relationship between the shank and the sleeve.

An impact stop 22 is preferably provided. The impact stop may take the disclosed form of a bolt which is threaded into a bore 23 in the shank 10. In the preferred and disclosed arrangement, the impact recess 24 is formed in the upper or impact end of the sleeve 15. The impact stop 22 is received in the recess 24 when a blow is imparted to impact end 25 of the shank 10. Coaction of the stop 22 and the recess 24 limits the rectilinear relative travel of the shank and sleeve to prevent cutting which is too deep and to prevent the shearing action which would occur by contact of the guide finger 17 with the end of the guide slot 16.

The sleeve 15 has a pair of cap locating fulcrums 28 at the lower or cutting end of the sleeve. The fulcrums 28 each have an end surface 29. The end surfaces 29 define segments of a cap receiving space or region 30 therebetween. As will be apparent from an examination of the drawings, the locating fulcrums are longitudinal extensions of the sleeve wall. The extensions are bent inwardly toward one another to define the cap receiving space. The locating fulcrums are on opposite sides of the space and preferably, as shown, spaced 180 degrees from one another.

The blade 11 has a pair of spaced longitudinally extending arms 31. The arms 31 are tines of a bifurcated chisel. Each of the tines is offset from the axis of the chisel. Each of the tines 31 has a blade edge 32 which is preferably normal to the axis of the entire tool. The tines or arms 31 are disposed opposite one another, or 180 degrees apart, mid-way between the locating fulcrums 28.

The blade ends of the arms 31, like the fulcrums 28, define part of the peripheral limit of the cap receiving space 30. The blades 30 are spaced from one another a distance which is only slightly greater than head 35 of a stud 36. They are so spaced in order that a cap 37 will be split by a cutting action of the chisel but the stud itself will be undamaged.

Figure 5:
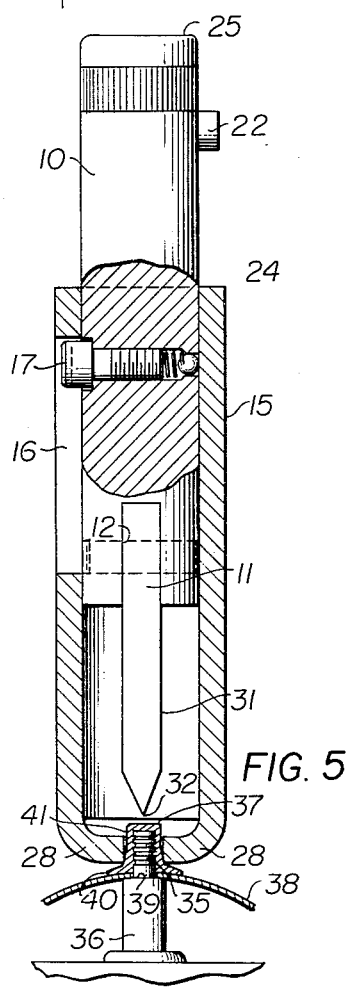
FIGURE 5 is a sectional view of the device on an enlarged scale with respect to FIGURE 1 and as seen from the plane indicated by the line 5—5 of the FIGURE 4 showing the device positioned to perform a cutting operation.
Figure 6:
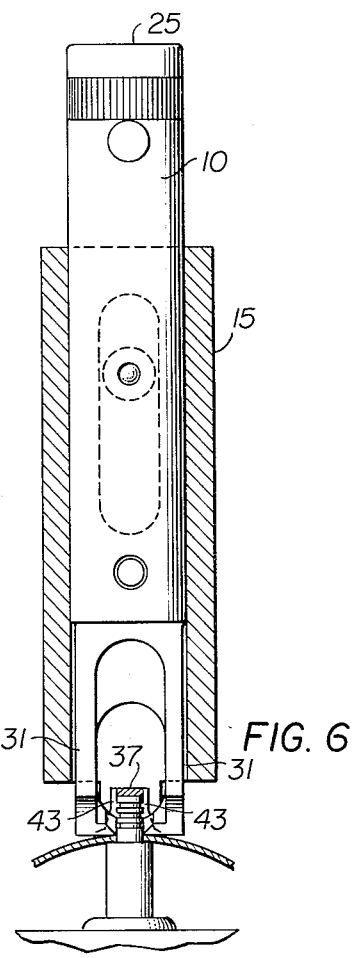
FIGURE 6 is a sectional view of the device on the scale of FIGURE 5 and as seen from the plane indicated by the line 6—6 of FIGURE 4 showing the device immediately after a cutting operation has been performed and before a prying operation has been performed.

The stud and cap are best seen in FIGURE 5. A panel 38 rides against a shoulder 39 on the stud 36. The panel 38 is held against the shoulder by a lower enlarged end 40 of the cap 37.

In removing the cap 37 from the stud 36, a removal tool is first positioned over the cap. The locating fulcrums serve as guides for locating the tool. The fulcrums are telescoped over an upper cylindrical part 41 of the cap 37 so that the cap projects into the cap space 30. After the tool has been positioned, the shank 10 is brought down until the blade edges 32 are against the cap 37. This is the position shown in FIGURE 5.

Next, one or more impacts are delivered to the impact end 25 of the shaft 10 while the operator holds the sleeve 15 in position. The bifurcated chisel is driven down until the blades 32 have formed longitudinal slices 43 on opposite sides of the cap. The slices 43 extend the full length of the side walls of the cap, but nonetheless, neither the stud nor the panel is damaged. The slices 43 separate the walls of the cap into two distinct portions.

Figures 7, 8:
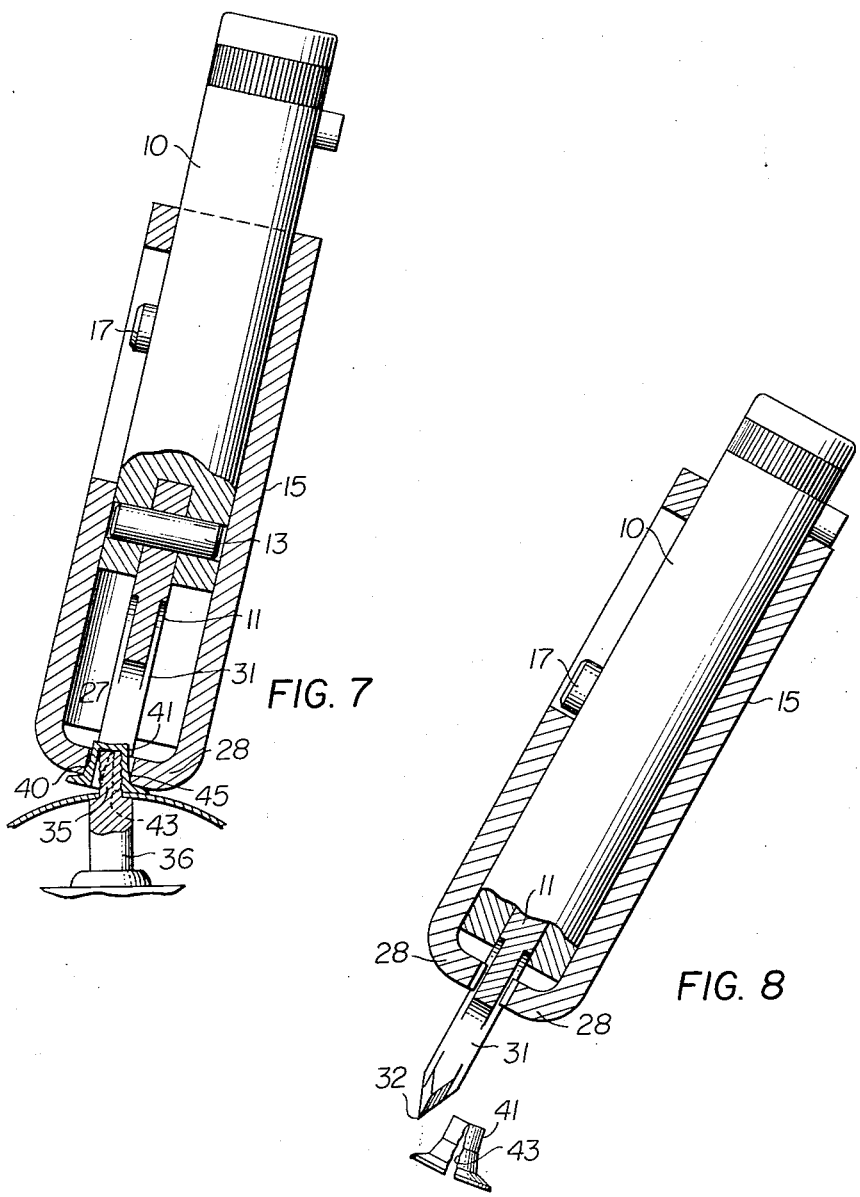
FIGURE 7 is a sectional view of the device in the plane and scale of FIGURE 5 showing the tool when a prying operation has been partially performed.
FIGURE 8 is a sectional view of the device in the plane and scale of FIGURE 5 showing the tool and a cap after the removal operation has been completed.

After the slices 43 have been formed, the tool is used as a pry to spread the two cap portions from one another. Prying action also will split the portions apart in the event that the slicing action has not cut fully through the side walls of the cap. The prying action is best understood by reference to FIGURE 7. One of the locating fulcrums coacts against the top part 41 of one of the cap split portions to serve as a pivot point or fulcrum for the prying action. A tool is pivoted about this fulcrum while the blade arms serve as levers to pry against the other portion of the cap, thereby spreading the split portions and opening the slices 43. The other of the fulcrums also acts against this other portion, thereby assisting in the prying operation. Since the preferred cap has a frusto-conical shaped intermediate portion 45 between the cylindrical top part 41 and the lower flange part 40, a separation of the portions is not uniform from end to end. This is best seen in FIGURES 7 and 8. Nonetheless, as seen in FIGURE 8, the cap is fully released from its engagement with the head 35 of the stud and the work operation has been completed.

While the invention has been described with a great deal of detail, it is believed that it essentially comprises a cap removing tool which has a chisel shank member and a positioning sleeve coactable with the shank to locate the tool relative to a cap. The tool includes blades to split a cap into a plurality of portions and is formed to permit a prying or separation of the split portions. The invention also includes the method of using such a tool.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A cap removing tool comprising a tubular guide sleeve, an impact shank carried in the sleeve in guided engagement therewith, the shank having an impact end and a blade end, a bifurcated blade fixed to the shank and forming the blade end thereof, said blade having a pair of longitudinally extending tines, each such tine having a transversely extending cutting edge, said tines defining two transverse extremes of a cap receiving space therebetween, said guide sleeve having a pair of longitudinally projecting guide fulcrums projecting from one end thereof and defining another two extremes of said cap receiving space, said sleeve and shank being relatively reciprocal, and guide means maintaining the shank and sleeve in rectilinear guided relationship.

2. A cap removing tool comprising a tubular guide sleeve member, an impact shank member carried in the sleeve member in guided engagement therewith, the shank having an impact end and a blade end, a bifurcated blade fixed to the shank and forming the blade end thereof, said blade having a pair of longitudinally extending tines, each such tine having a transversely extending cutting edge, said tines defining two transverse extremes of a cap receiving space therebetween, said guide sleeve member having a pair of longitudinally projecting guide fulcrums projecting from one end thereof and defining another two extremes of said cap receiving space, said sleeve and shank members being relatively reciprocal, one of the members having a longitudinally extending guide slot, and a guide pin fixed to the other of the members and projecting into the slot, the longitudinal walls of the slot defining a rectilinear guide path for said pin whereby to maintain the shank and sleeve members in rectilinear guided relationship.

3. A cap removing tool comprising a tubular guide sleeve, an impact shank carried in the sleeve in guided engagement therewith, the shank having an impact end and a blade end, a bifurcated blade fixed to the shank and forming the blade end thereof, said blade having a pair of longitudinally extending tines, each such tine having a transversely extending cutting edge, said tines defining two transverse extremes of a cap receiving space therebetween, said guide sleeve having a pair of longitudinally projecting guide fulcrums projecting from one end thereof and defining another two extremes of said cap receiving space, said sleeve and shank being relatively reciprocal, said sleeve having a longitudinally extending guide slot, and a guide pin fixed to said shank and projecting into the slot, the longitudinal walls of the slot defining a rectilinear guide path for said pin whereby to maintain the shank and sleeve in rectilinear guided relationship.

References Cited in the file of this patent

UNITED STATES PATENTS

| | | |
|---|---|---|
| 864,486 | Parsons | Aug. 27, 1907 |
| 2,373,872 | Couture | Apr. 17, 1945 |
| 2,688,185 | Brazil et al. | Sept. 7, 1954 |
| 2,731,714 | Dudley | Jan. 24, 1956 |
| 2,836,888 | Hargrove | June 3, 1958 |
| 2,853,723 | Winslow | Sept. 30, 1958 |
| 2,874,457 | Bennett | Feb. 24, 1959 |

FOREIGN PATENTS

| | | |
|---|---|---|
| 174,292 | Switzerland | June 1, 1935 |